(12) United States Patent
Farrell (10) Patent No.: US 9,977,608 B2
(45) Date of Patent: May 22, 2018

(54) DIGITAL MEMORY IMAGING SYSTEM AND METHOD

(71) Applicant: Mobile Content Management Solutions Limited, Horsham Sussex (GB)

(72) Inventor: Paul Farrell, Horsham Sussex (GB)

(73) Assignee: MOBILE CONTENT MANAGEMENT SOLUTIONS LIMITED, Horsham (GB)

( * ) Notice: Subject to any disclaimer, the term of this patent is extended or adjusted under 35 U.S.C. 154(b) by 8 days.

(21) Appl. No.: 14/648,806

(22) PCT Filed: Dec. 5, 2013

(86) PCT No.: PCT/GB2013/053217
§ 371 (c)(1),
(2) Date: Jun. 1, 2015

(87) PCT Pub. No.: WO2014/096775
PCT Pub. Date: Jun. 26, 2014

(65) Prior Publication Data
US 2015/0331618 A1    Nov. 19, 2015

(30) Foreign Application Priority Data

Dec. 21, 2012  (GB) ........................ 1223194
Jan. 15, 2013  (GB) ................... 1300690.3
Sep. 26, 2013  (GB) ................... 1317136.8

(51) Int. Cl.
*G06F 3/06* (2006.01)
*G06T 11/20* (2006.01)
*G11B 5/86* (2006.01)

(52) U.S. Cl.
CPC ............ *G06F 3/0613* (2013.01); *G06F 3/065* (2013.01); *G06F 3/0655* (2013.01);
(Continued)

(58) Field of Classification Search
None
See application file for complete search history.

(56) References Cited

U.S. PATENT DOCUMENTS

RE37,038 E  *  1/2001  Eastridge ............ G06F 11/1461
                                                    707/999.202
2004/0260733 A1*  12/2004  Adelstein .............. H04L 63/123
(Continued)

FOREIGN PATENT DOCUMENTS

JP         H11-25574         1/1999

OTHER PUBLICATIONS

UKIPO Communication for GB1509436.0 dated Nov. 20, 2015.
(Continued)

*Primary Examiner* — Brian R Peugh
*Assistant Examiner* — Dustin Bone
(74) *Attorney, Agent, or Firm* — Blank Rome LLP (57) ABSTRACT

A digital memory imaging system for imaging the digital memory of a target computer (1) comprising: a plurality of removable data storage devices (3, 5, 7, 9, 11, 13) each receivable by the target computer (1); an imaging means configured to image the digital memory of the target computer; an output means to output the imaged digital memory as a series of data blocks to two or more of the removable data storage devices (3, 5, 7, 9, 11, 13).

20 Claims, 5 Drawing Sheets

(52) U.S. Cl.
CPC .......... *G06F 3/0683* (2013.01); *G06F 3/0685* (2013.01); *G06T 11/206* (2013.01); *G11B 5/86* (2013.01)

(56) References Cited

U.S. PATENT DOCUMENTS

| | | | |
|---|---|---|---|
| 2006/0174156 A1* | 8/2006 | Balasubramanian | ...................... G06F 11/1658 714/6.12 |
| 2011/0191533 A1* | 8/2011 | Coulter | .................. G06Q 10/00 711/112 |
| 2011/0307451 A1 | 12/2011 | El Haddi et al. | |
| 2013/0067174 A1* | 3/2013 | Moss | .................. G06F 11/1076 711/154 |

OTHER PUBLICATIONS

Slay, et al. iPod Forensics: Forensically Sound Examinaton of an Apple iPod; Computer Society, 2007.
Hasan, et al. "Overview on Computer Forensics Tools", UKACC International Conference on Control 2012 (pp. 400-403).

* cited by examiner

DIGITAL MEMORY IMAGING SYSTEM AND METHOD

The present invention relates to a digital memory imaging system and method. In particular, the present invention relates to a system for digital memory imaging for use by the police, law enforcement, intelligence and military personnel and has particular application in the field of computer forensics.

Investigations by police, law enforcement, intelligence and military personnel often require the covert acquisition of data by digital memory imaging, with the data acquired often used as evidence in future proceedings. The imaging process takes a "bit-for-bit" image of the data; for example, from a hard drive. It is known to store the digital memory image to a removable memory device (RMD), such as a USB flash drive. However, the removable memory device has a limited storage size and often a single device is not sufficient for the required imaging process. If the digital memory image is greater than the size of the RMD not all of the data required can be extracted. It has also been found that data imaging to a removable memory device is much slower than reading the digital memory, which can create a "bottleneck" in the imaging process, such that the required evidence cannot be acquired or the covert nature of the imaging is threatened.

When attempting to image a hard drive to a single USB device, the user needs to ensure that there is sufficient space on the USB device to store the entire drive image. For example 80 GB of free space is needed to image an 80 GB hard drive, regardless of whether all of the 80 GB of free space is in use by the target hard drive. This is because the imaging process images all of the files on the target drive in addition to all of the free space. Thus, it is common for investigations to run out of time or storage space to image the required target drive Known tools for forensic imaging of a PC/laptop to a USB device are inefficient and slow. Common tools, such as the "FTK" Forensic Toolkit® Imager provided by AccessData® Group, or the EnCase® Forensic Imager, provided by Guidance Software Inc., rely on the imaging system being executed from a USB device, to which the data is then imaged through a single USB port. Known imaging tools also operate from a "boot environment" whereby the target machine, that is to imaged, needs to be booted up using a CD-ROM or USB device containing an edited version of an operating system, to allow the imaging device to access the internal drives of the target machine. Known boot environment CD-ROMs include the "Helix-3", provided by e-fense Security Solutions and the Paladin® bootable CD. The lack of speed and inefficiency of such known systems are detrimental to the covert nature of the investigations and often mean that all of the required data cannot be imaged, particularly when there is only a very limited time available to acquire the data.

In addition to the inefficiency of known imaging systems, hard drives are now larger meaning that it takes an increasing amount of time to image the necessary data over USB devices. It is known to attach a target hard drive to a specialist drive imager, such as the "Tableau TD1 Forensic Duplicator" provided by Guidance Software Inc., which allows the hard drive to be imaged quicker. However, it is time-consuming and inconvenient to carry out the necessary removal and replacement of the hard drive from the machine to be investigated, to allow TD1 imaging to take place. If the time and opportunity exist to remove the hard drive during the investigation, this can typically take from 20 minutes to several hours in addition to the time needed to re-install the hard drive after imaging. Thus, when investigations are required to be conducted in a tight time frame it is often only possible to obtain a partial image of the hard drive and vital evidence is not captured. Furthermore, it is increasingly common that it is not possible to remove the hard drive to allow imaging to take place with these known devices. For example, the hard drive is located behind a screen/s or buried within the electronics of the computer itself. The hard drive can also be bonded to the computer or have security stickers to indicate when the drive has been tampered with. This not only makes removal difficult and time consuming, but risks exposing a covert operation when it is paramount that the computer is left in an identical condition so that the investigation of the computer cannot be detected.

US Patent Publication US2006/0164743 discloses a method for one-to-multiple copying of a data storage medium wherein source data in a hard disc is copied to a plurality of hard discs one by one. Such methods are well-known to allow tandem reading and storing of the entire hard disc in a personal computer on each of a series of hard discs. The purpose of such methods is to provide multiple copies of the source or target hard disc. For use in investigations, the primary purpose of such a method is to simultaneously create one copy to be held as the 'evidential copy', and other copies to be distributed to one or more personnel across teams. Thus the imaged data is available for multiple people to investigate and analyse so that the speed of the investigative process is increased. In addition the method disclosed in US 2006/0164743 alleviates the problem of hardware problems on the hard disks where the data is imaged, which is the most likely failure point in a hard disc copying process. In a covert operation, such direct copying is, in reality, time-consuming and inefficient. When a user requires the target hard disc to be copied only once as quickly and accurately as possible, this method does not provide an adequate solution. The method of US 2006/0164743 also requires the removal of the hard disc from the computer, causing the problems discussed above.

Furthermore, to complete the imaging process of any digital memory often requires a considerable period of time, for example, several consecutive hours. The covert nature of the investigation often makes it unlikely that this necessary period of time is available. Existing digital memory imaging systems, which are not devised for covert investigation, are such that if the full time required is not available then digital memory imaging cannot be successfully achieved. For example, if a user wishes to image an 80 GB hard drive but is interrupted part-way through the time required for a complete 80 GB image to be acquired, then no imaged data is available for the user to take away.

US patent publication US2007/0043967 discloses an automatic reconnect and reacquisition in a computer investigation system. The system is for use over a network of computers. When connection is lost during acquisition of data from the network, the examining computer is able to automatically attempt reconnection of the investigation system and once connection is re-established the target machine continues the acquisition from an intermediate state i.e. from when connection was lost. The system of US2007/0043967 is not suitable for use in covert investigations because it requires prior permission for the user to connect to the network of computers and have authorised access. This system is suitable only for acquiring data from a network (and where the target computer is overtly running the imaging client software) not for imaging digital data directly to a removable memory device, such as a USB.

The present invention sets out to alleviate the problems described above by providing a digital memory imaging system and method with increased efficiency, which allows for rapid and secure data extraction.

In one aspect, the present invention provides a digital memory imaging system for imaging the digital memory of a target computer comprising:
- a plurality of removable data storage devices each connectable to the target computer;
- an imaging means configured to image the digital memory of the target computer;
- an output means to output the imaged digital memory as a series of data blocks to two or more of the removable data storage devices; and
- an assignment means configured to assign each data block of imaged digital memory to a selected removable data storage device according to a queuing system, wherein each removable data storage device has a queue of data to be stored that is constantly monitored.

By dividing the storage of the digital memory across multiple removable data storage devices, the speed and efficiency of the system is much improved.

It is to be understood that the digital memory of the target computer includes any of a hard disc; a flash memory; or random-access memory (RAM). The present invention has been shown to rapidly image the digital memory of a target computer, particularly for solid state drives (SSDs), without the need to remove the drive from the target computer. The present invention thus allows a user to image a large target digital memory without the risk of interruption and/or detection during a covert operation; for example, when only a short time period is available and when it is imperative not to leave any evidence that the target computer has been accessed.

Preferably, the plurality of removable data storage devices comprise any combination of a USB; eSata external drive; SD card; SD micro card; FireWire® drive; Thunderbolt® drive.

More preferably, the assignment means is configured to assign each data block of imaged digital memory according to the free memory available on each removable data storage device and/or the speed of the removable data storage device.

Assigning the imaged data according to the amount of data each removable data storage device currently has to read and store, and/or the speed of the removable data storage device, creates a dynamic queuing system. The queuing system ensures that the efficiency and speed of the imaging system is optimised.

Preferably, the digital memory imaging system further comprises a display means.

A display means allows a user to monitor the imaging system. For example, a user can view which of the removable data storage devices are available to be used; when the imaged data is to be converted into an image file. The display can also notify a user when replacement of a removable memory device is required and so avoid any shortages in image storage capacity.

Preferably, the digital memory imaging system further comprises a labelling means to label each imaged data block with a header comprising any combination of a sequence number; data block length; source address; a compression value; a time stamp; a unique identifier.

By labelling the data blocks, the system can accurately and efficiently recombine and validate the digital memory image.

Preferably, the digital memory imaging system further comprises a storing means, wherein the storing means reacts to an interruption of the imaging of the digital memory to store the imaged digital memory to the point of interruption.

A storing (holding) means allows the system to store part of the digital memory of the target computer if the system is interrupted and later resume imaging of the digital memory from the point of interruption. This allows a user to obtain a valuable portion of digital memory data during a covert operation if sufficient time cannot be committed to image the entire target digital memory.

In a second aspect, the invention provides a digital memory imaging method for imaging the digital memory of a target computer comprising the steps of:
- connecting a plurality of removable data storage devices to the target computer;
- imaging the digital memory of the target computer;
- outputting the imaged digital memory as a series of data blocks to two or more of the removable data storage devices;
- assigning each data block of imaged digital memory to a selected removable data storage device according to a queuing system, wherein each removable data storage device has a queue of data to be stored that is constantly monitored.

Preferably, the method comprises the step of assigning each data block of imaged digital memory according to the free memory available on each removable data storage device and/or the speed of the removable data storage device.

Preferably, the digital memory imaging method further comprises the step of displaying progress information relating to the imaging system.

Preferably, the digital memory imaging method further comprises the step of labelling each imaged data block with a header comprising any combination of a sequence number; data block length; source address; a compression value; a time stamp; a unique identifier.

Preferably, the digital memory imaging method further comprises the step of storing the imaged digital memory at a point of interruption.

For the purposes of clarity and a concise description, features are described herein as part of the same or separate embodiments; however it will be appreciated that the scope of the technology may include embodiments having combinations of all or some of the features described.

These and other characteristics of the present technology will be more fully understood by reference to the following detailed description in conjunction with the attached drawings, in which.

The figures described herein, wherein like parts are designated by like reference numerals throughout; illustrate example embodiments of a digital memory imaging system and method according to the present technology. Although the present technology will be described with reference to the example embodiments shown in the figures, it should be understood that many alternative forms can embody the present technology.

Figure 1:
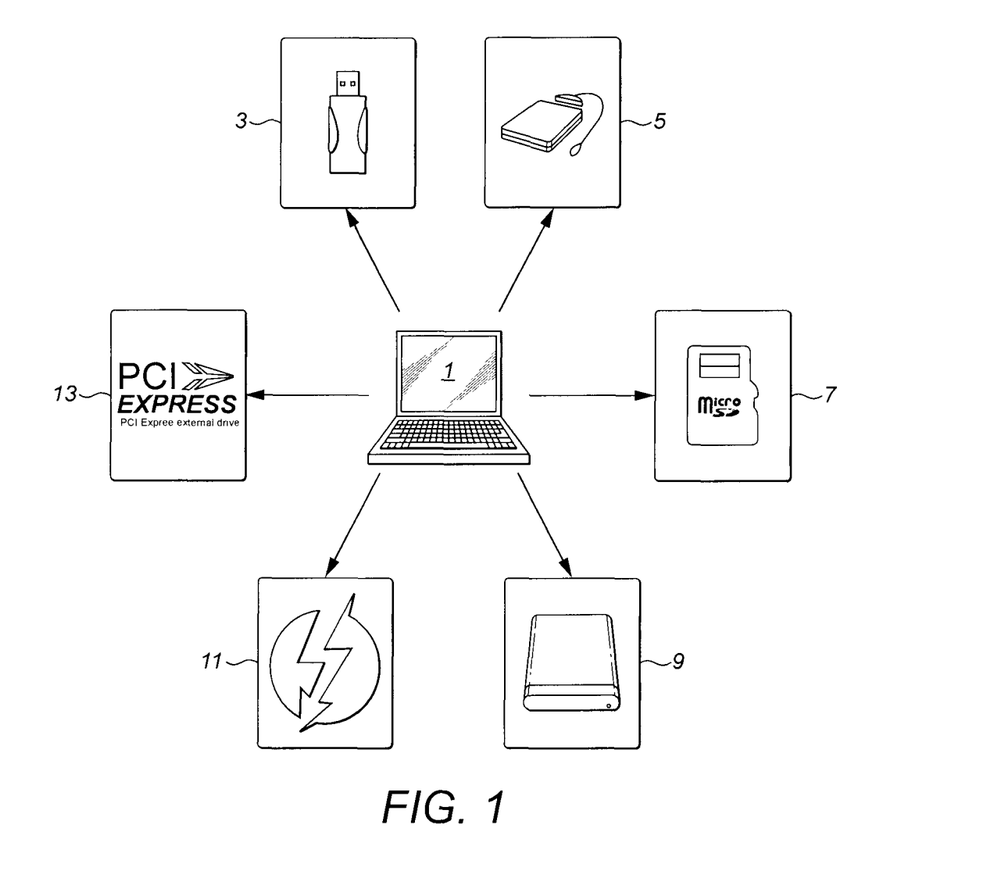
FIG. 1 is a block diagram of an example of the digital memory imaging system constructed in accordance with the present invention.

Referring to FIG. 1 and an example of the digital memory imaging system, the target computer 1, is able to receive multiple, removable data storage devices including any combination of USB 1.0, USB 2.0 and 3.0 drives 3; eSata external drives 5; SD and SD micro cards 7; FireWire® drives 9; Thunderbolt® drives 11 and PCI Express external drives 13. The target computer is understood to be a personal computer, a laptop, a tablet computer, or any similar device capable of connecting to a removable data storage device.

A user having access to the target computer 1 introduces the digital memory imaging system to the target computer 1 via the USB 1.0, 2.0 or 3.0 drive 3 or similar device, 5, 7, 9, 11, 13. A USB drive 3 is connected to the target computer 1 and acts as a "host" device to allow the digital memory imaging method to be carried out.

Figure 2A:
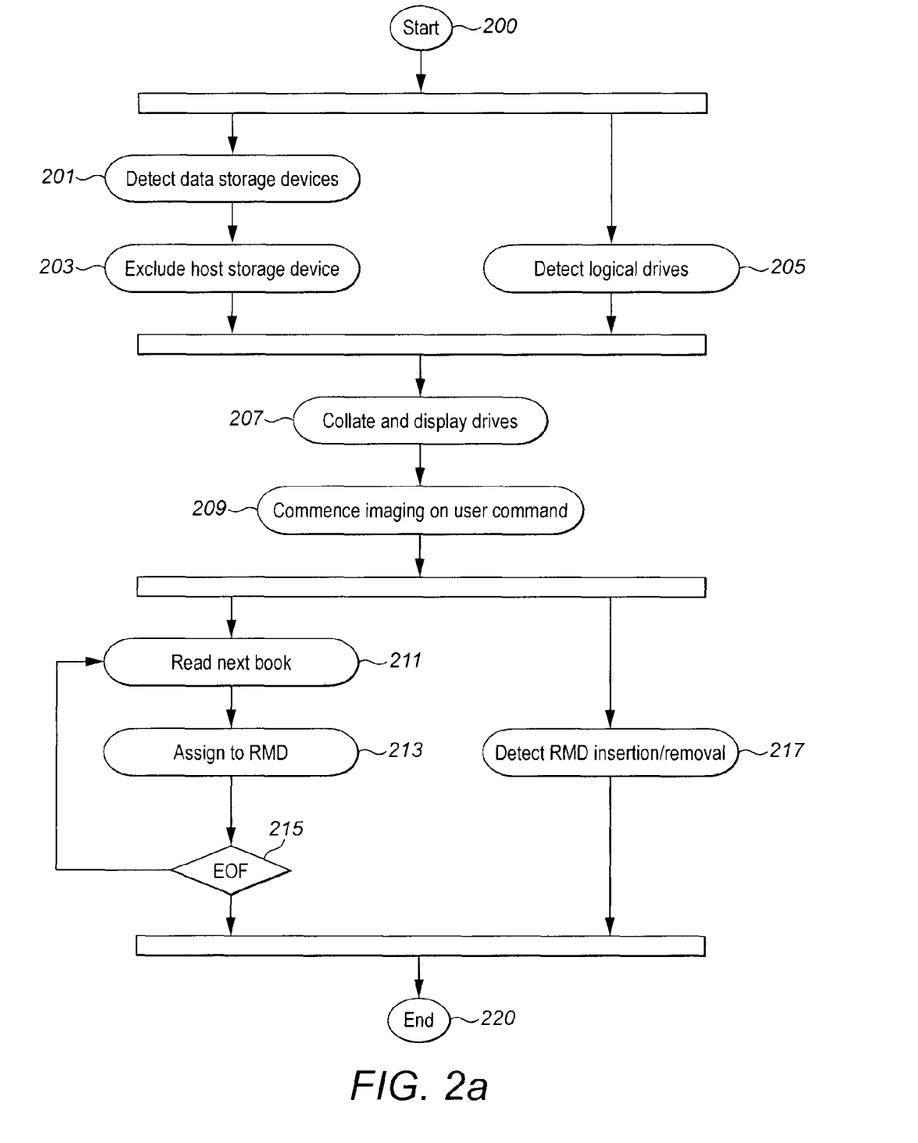
FIG. 2a is a flow diagram of the digital memory imaging method of a first embodiment of the present invention.

Referring to FIG. 2a, in a preferred embodiment of the digital memory imaging method, the digital memory imaging system is connected to the target computer in step 200 and the digital memory imaging method starts. In step 201 the system detects the data storage devices i.e. the physical, fixed digital memory (drive) devices to which the target computer's digital memory is to be imaged. For example, in step 201, the system detects that three USB 2.0 devices; two USB 3.0 devices and one PCIe USB 3.0 card are inserted into the target computer. In step 203 the system excludes the host storage device; for example the USB 2.0, USB 3.0 or similar removable data storage device on which the imaging system is stored. Thus, in the above example the system detects that one USB 2.0 device carries the digital memory imaging system and that the remaining two USB 2.0 devices; two USB 3.0 devices and one PCIe USB 3.0 card are to be used to image the target computer's hard disc (digital memory). It is understood that reference to the hard disc includes any form of digital memory, such as a flash memory or random access memory (RAM). Simultaneously in step 205, the system detects the logical drives i.e. the digital memory of the target computer.

In step 207, the system collates and displays the devices and drives that it has previously detected. For example, the information is displayed on the target computer screen. In step 209, a user instructs the system to commence imaging of the target digital memory.

The system then begins imaging the target digital memory by reading the memory sequentially in large data blocks. The data block size is pre-determined to ensure optimum performance for common device types. It has been found that a block size of 8 MB allows for an optimum balance between the memory capacity of the computer carrying out the method and the queue length for storing the data blocks across the multiple removable memory devices. For example, a small personal computer has a memory of around 512 MB and a data block size of 8 MB is small enough not to overload a target computer with memory of this size, whilst the data block size of 8 MB is large enough that usage of the central processing unit (CPU) is mostly kernel time such that processing is as efficient as possible.

Referring to steps 211, 213, 215 the system proceeds so that as each block of data is read from the target digital memory in step 211 it is imaged and assigned for storage on one of the detected removable memory devices (RMD). The assignment is determined according to a hierarchical queuing system. Each removable memory device has a queue of data to be stored. The preferred data block size of 8 MB is selected to be compatible with the queue length to avoid output idling. In step 213 each block of data that is read is assigned to the shortest RMD queue. Each data block is thus assigned to the RMD currently having the least amount of data to store and/or the RMD with the greatest speed. This ensures maximum storage efficiency across the multiple removable memory devices. The queuing system is dynamic whereby the queue of each removable memory device is constantly monitored.

Figure 2B:
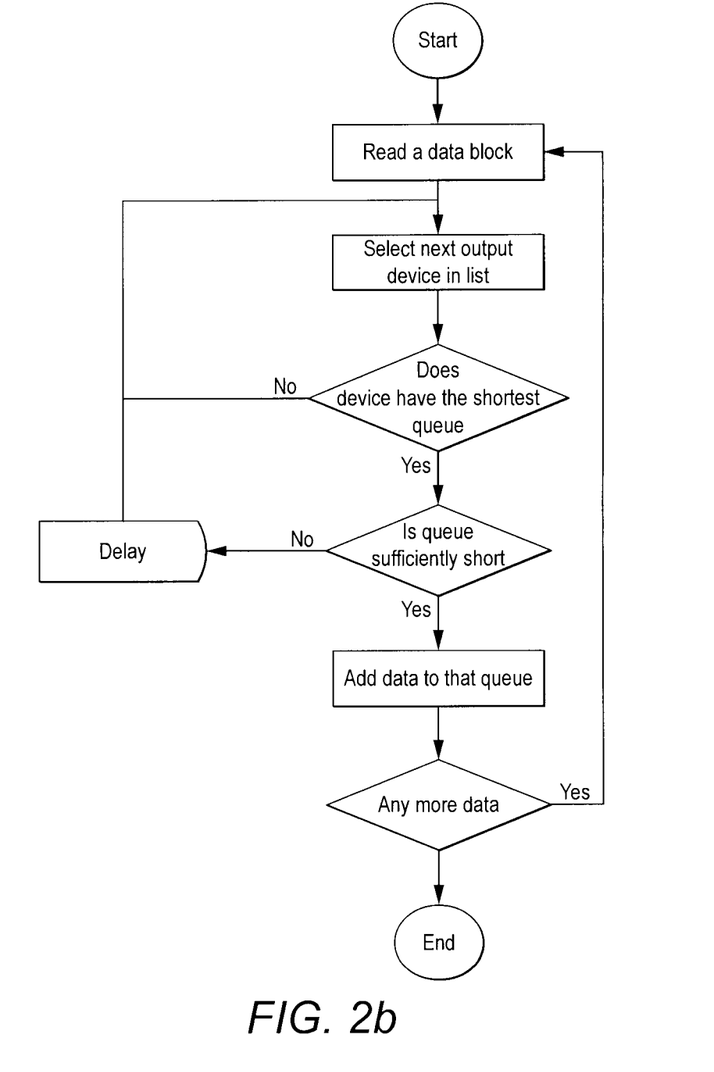
FIG. 2b is a flow diagram of the dynamic queuing carried out by the digital memory imaging method of a first embodiment of the present invention.

Referring to FIG. 2b, the assignment of each data block starts at step 222 before the system reads the data block at step 224. At step 226, the system selects the next RMD output device and asks at step 228 whether this is the device having the shortest queue. If the device is detected to have the shortest queue at step 230, the data block is added to that queue, i.e. to be stored on that RMD. However, if the RMD does not have the shortest queue at step 228, the system moves to step 226 to select the next RMD in the list and again ask, at step 228, if this device has the shortest queue.

When the system has repeated the necessary steps to arrive at the RMD with the shortest queue, it checks at step 230 whether the queue is sufficiently short to allow for efficient storage of the data block. If the queue is not sufficiently short and addition of the data block is likely to affect the efficiency of the system, the addition of the data block is delayed at step 232. If the queue is sufficiently short, the data block is added to the queue of the selected RMD, at step 234. At step 236, the dynamic queuing system continues to assign each data block in the same way until all of the data has been imaged and stored and the method ends, at step 238.

Referring to FIG. 2a, the reading, imaging and storing of the target computer's digital memory continues until there is no more data to be read and at step 215 the end of the file (EOF) is detected. Thus, the imaging process continues until the entire target memory has been imaged and the method ends at step 220.

Simultaneously with the reading and imaging storing process, 211, 213, 215, the system detects in step 217 if any of the data storage devices (RMDs) are full. Detection of a full data storage device will be indicated to a user via the system display. This gives a user the opportunity to remove the full device and replace with a new RMD having capacity for storage. The system also detects in step 217 if a new data storage device is inserted or if a full data storage device is removed or disconnected from the target computer. The system does not limit the number of removals/disconnections or insertions/connections of data storage devices in a single imaging process. Thus, there is no limit to the amount of data that can be imaged by the system of the present invention.

As shown in FIG. 2a, the imaging process is continuous until the entire digital memory of the target computer has been imaged. During imaging the volume of data that has been imaged and the remaining amount of data to be imaged is monitored to avoid any shortages in memory capacity or any consequent reduction in the data transfer speed. In further embodiments of the invention "read throttling" and "garbage collection" are initiated at intervals during the imaging process where such processes have been shown to be most effective. Read throttling is initiated whenever the shortest of the RMD output queues contains 20 items. Garbage collection is done at the same time, when a new buffer cannot be supplied by the operating system.

At step 220, when the imaging process is completed the data that has been collected will be converted into an image file. The user-interface provides suitable displays to prompt a user to initiate the conversion.

Referring to FIG. 2a and step 211, the target data to be imaged is read in blocks. Each data block comprises a header of 4096 bytes, followed by the data segment to be imaged. The header comprises information as a text string with the following fields:
  i) Sequence number of the data block: (0, 1, 2, 3 . . . n);
  ii) Data length: byte count of the data segment.
  iii) Compression value: If this value is zero, then the data is uncompressed. If it is non-zero it refers to the technique used to compress the date segment. In the preferred embodiments of the present invention, compression is performed with a "gzip" algorithm;
  iv) Source address: the address on the target memory device from which the data block was extracted;
  v) Time stamp: Indicating when the data imaging started;
  vi) Unique identifier of the data collection run: A 16-byte Globally Unique Identifier (GUID) generated at the start of the data collection process.

The sequence number and compression value are used when recombining the imaged data at step 220 to form an image file of the target digital memory. The time stamp and unique identifier allow the imaged data to be validated.

In an alternative embodiment of the present invention, if a user does not have access to a "host" device carrying the digital memory imaging system, the method includes an additional step prior to step 201 wherein a blank USB device is connected to the target computer and the digital memory imaging system is downloaded via the Internet. The instructions as to how to download the system are provided separately to the USB or alternatively brief instructions are provided on the USB regarding access to download. It is envisaged that, in a preferred embodiment, a user will be authorised to access the system or given permission to download the system via a license provided on a USB device. The user will then be able to validate multiple removable data storage devices according to their requirements As illustrated by the test results shown in Appendix 1, the imaging speed is increased by effectively splitting the imaging process across multiple data storage devices connected to the target machine. The data storage devices can be inserted into each of the following ports in any combination: USB 1.0; USB2.0; USB3.0; PCIe; card slots; SD card slots; Apple® FireWire® and Apple® Thunderbolt®. With multiple data storage devices connected to the target machine, the drive image is effectively divided across the different ports and so different mainboard BUS channels. This increases the speed and efficiency of imaging and also enables the size of the target drive to be divided across several data storage devices.

Figure 3:
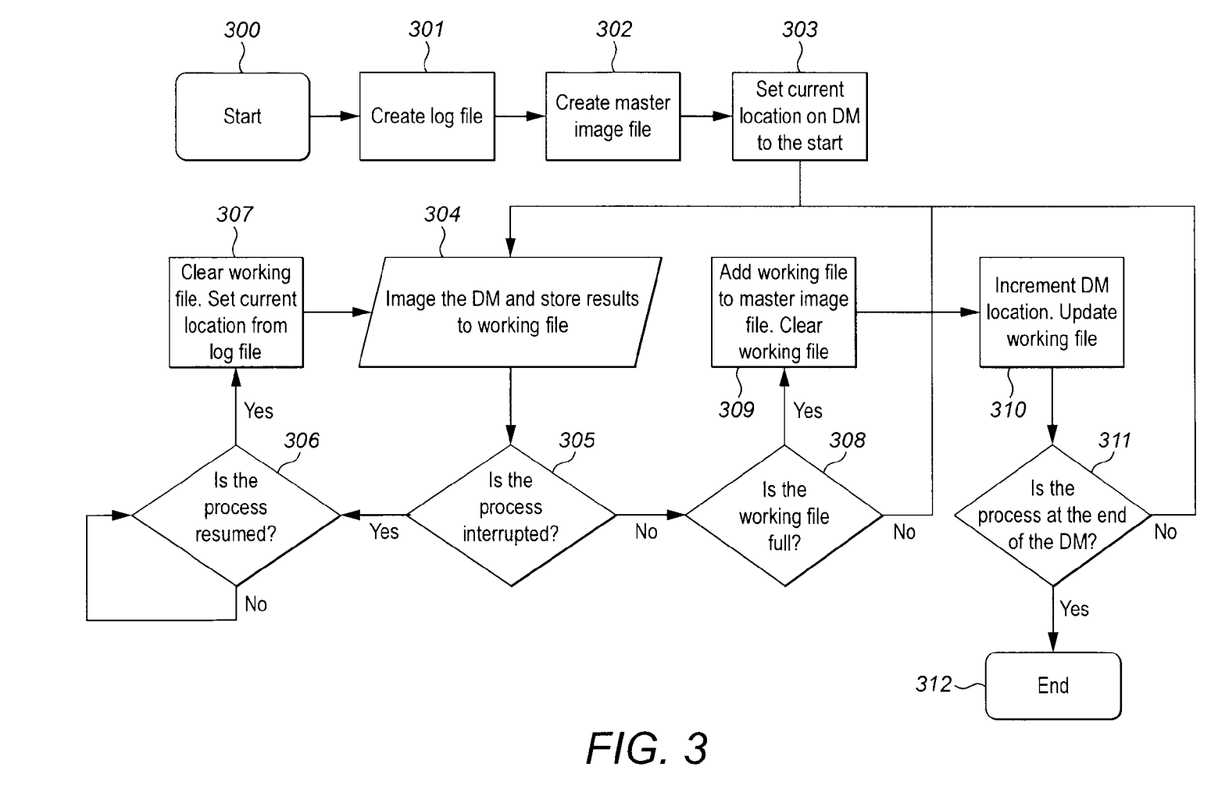
FIG. 3 is flow diagram of the digital memory imaging method of an alternative embodiment of the present invention.
Figure 4:
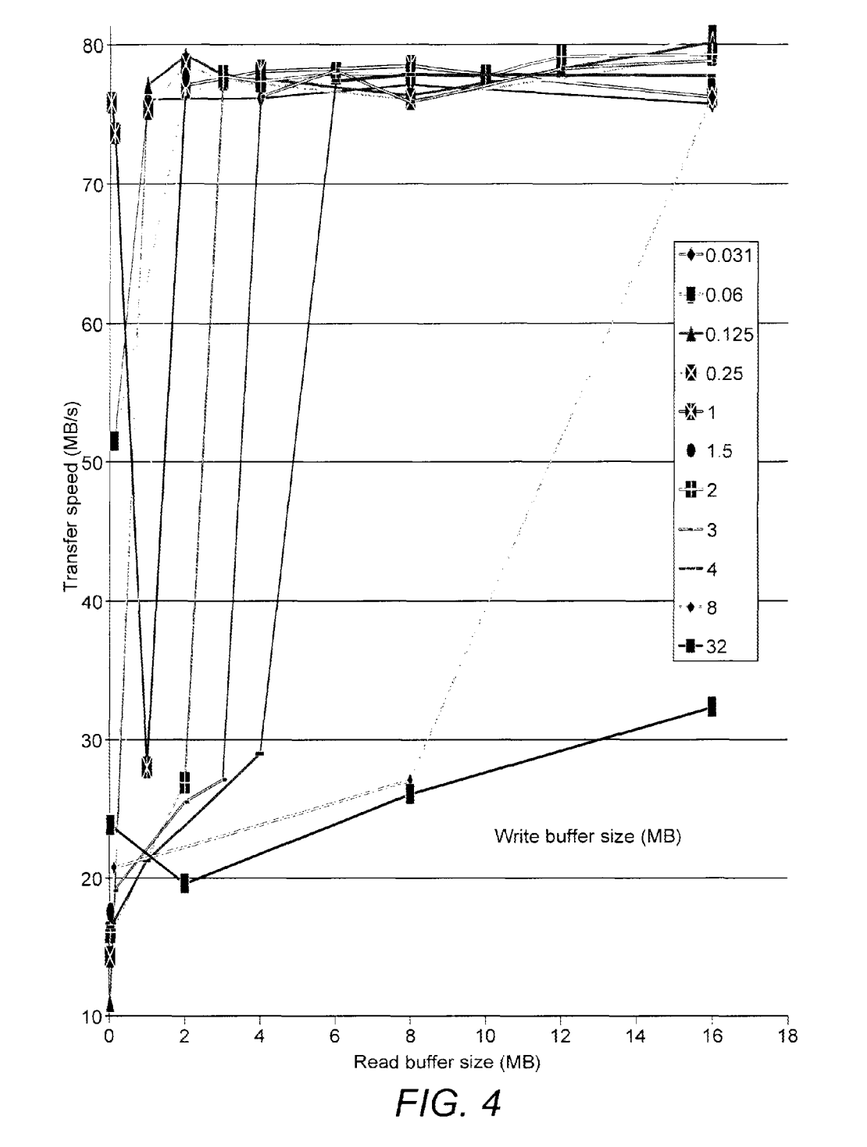
FIG. 4 is a graph illustrating the testing detailed in Appendix 2 showing transfer speed against read buffer size for various write buffer sizes on a typical "mid-range" system.

Referring to FIG. 3 and an alternative embodiment of the imaging system of the present invention, the above-described method can be carried out over multiple sessions because the method includes the option to start and stop the process as required. The alternative embodiment shown in FIG. 3 allows the user to stop and store imaging results before resuming the imaging method i.e. the system is placed "on hold". At step 300 the imaging process is started and at step 301 the system creates a log file corresponding to the current location that is being imaged and the location is stored in the log file. At step 302 the system creates a master image file, where the imaged data will be stored. At step 303, before imaging commences the current location of the digital memory is set to the start.

At step 304 the imaging process starts to image the digital memory of the target computer and the image results are stored into a working file. The position of the digital memory is incremented and indexed and the log file is updated as imaging progresses. For example, in a windows environment, each byte on a disc drive or solid state device (SSD) is indexed as consecutive number from zero with consecutive numbers in several separate ranges being used to index each byte in RAM. At step 305 the system monitors whether the imaging process is interrupted. If an interruption occurs, at step 306 the system monitors whether the process has been resumed. Following an interruption, at step 307 when the process is resumed the log file is used to direct the system to resume the imaging process from the point of interruption.

The imaging method continues until, at step 308, the working image file is full. At step 309 the working file is added to the master image file and the working image file is cleared. Step 310 increments the digital memory location and the working file is updated accordingly. This process of updating the working file and checking for interruptions continues until, at step 311, the system reaches the end of the target digital memory, or the user stops the process. The process ends at step 312. If the user stops the process, the image result in the current working file is ignored and the user will have imaged only part of the target digital memory. Multiple master image files can be used if required and when a master image file reaches a pre-determined size a new master image file is created. This allows a user to collect a part of the digital memory in any one session and image the entire digital memory over multiple sessions.

The above described embodiments have been given by way of example only, and the skilled reader will naturally appreciate that many variations could be made thereto without departing from the scope of the claims.

Any values provided herein are illustrative and in no way limiting of the present invention. Upon reading the present specification, one of skill in the art will appreciate a wide variety of other parameters that can be used to implement the digital memory imaging system and method. All such alternatives and modifications are contemplated within the scope of the present invention as defined by the claims.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the invention may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

APPENDIX 1

By way of comparison, to illustrate the improved speed and efficiency of the present invention, set out in Table 1 is experimental data of the time taken to image a target hard drive using a single USB port using the known imaging technology, FTK Imager v3 1.3.2 Forensic Toolkit® Imager, provided by AccessData® Group, with the drive attached to the Tableau TD1 Forensic Duplicator provided by Guidance Software, Inc.

TABLE 1

| Laptop | Hard Drive | CPU | RAM (GB) | Tableau TD1 Drive Imager | | FTK Imager (USB 2.0) | | FTK Imager (USB 2.0) | |
|---|---|---|---|---|---|---|---|---|---|
| | | | | Time to Image (mins) | Speed (GB/min) | Time (min) | Speed (GB/min) | Time (min) | Speed (GB/min) |
| Test 1 | | | | | | | | | |
| Dell Latitude (RTM) E6230 | Hitachi HTS7250 32A7E630 320 GB 7200 rpm | Core i5 3380M Processor | 4 | 76 | 4.211 | 230.05 | 1.391 | 82.13 | 3.896 |
| Test 2 | | | | | | | | | |
| Dell Alienware M18x | Samsung PM830 256 GB SSD | Core i7 3920XM Processor @ 3.1 GHz | 16 | 50.55 | 5.064 | No USB 2.0 ports | | 40.85 | 6.267 |
| Test 3 | | | | | | | | | |
| Dell Vostro 3450 | Samsung HM320HJ 320 GB 7200 rpm | Core i5 2410M Processor @2.3 GHz | 4 | 77.80 | 4.113 | 224 | 1.429 | 84.58 | 3.783 |

Table 2 sets out experimental data of the time taken to image a target hard drive using the digital memory imaging system and method of the present invention, with a variety of ports being used to make use of a combination of data storage devices connected to the target machine.

With reference to Test 2, conducted for an SSD drive, the prior art TD1 system imaged the drive in 50 minutes 33 seconds at a rate of 5.064 GB/min; the prior art FTK system imaged the drive in 40 minutes 51 seconds at a rate of 6.267 GB/min. The imaging system of the present invention

TABLE 2

| Laptop | Hard Drive | CPU | RAM (GB) | Performance Laptop On | | Performance Laptop Off | | Ports Used |
|---|---|---|---|---|---|---|---|---|
| | | | | Time to Image (mins) | Speed (GB/min) | Time (mins) | Speed (GB/min) | |
| Test 1 | | | | | | | | |
| Dell Latitude (RTM) E6230 | Hitachi HTS7250 32A7E630 320 GB 7200 rpm | Core i5 3380M Processor | 4 | 75.98 | 4.212 | 69.52 | 4.604 | 1 x USB2.0 2 x USB3.0 |
| Test 2 | | | | | | | | |
| Dell Alienware M18x | Samsung PM830 256 GB SSD | Core i7 3920XM Processor @ 301 GHz | 16 | 11.33 | 22.59 | 13.52 | 18.94 | 2 x USB3.0 1 x eSATA |
| Test 3 | | | | | | | | |
| Dell Vostro 3450 | Samsung HM320HJ 320 GB 7200 rpm | Core i5 2410M Processor @2.3 GHz | 4 | 58.52 | 5.469 | 73.00 | 4.385 | 2 x USB2.0 2 x USB3.0 1 x PCIe USB3.0 Card |

Comments on Test Results

It can be seen that the present invention increases the speed and reduces the time taken in data imaging.

With solid state devices (SSDs) the increases in the speed of imaging offered by the present invention are significant. The tests detailed herein show an imaging speed that is around 4-5 times faster than known devices.

imaged the drive in 11 minutes and 20 seconds at a much faster rate of 22.59 GB/min.

The increase in imaging speed is in addition to the time saved because the present invention does not require the drive to be removed from the target computer, i.e. the system of the present invention allows for imaging of the digital memory of the target computer with the SSD drive remaining in situ in the computer. To allow for imaging of a spinning drive, i.e. a non-SSD drive, the prior art TD1 system requires the hard drive to be removed from the target computer and attached to the TD1 imager for imaging to take place. The removal typically takes at least 20 minutes in addition to the required imaging time. The drive then needs to be replaced without leaving signs of its removal/replacement. Some computers systems have their hard drives located behind screens or located in other inaccessible areas or indeed with tamper proof seals etc. making removal/replacement impossible in covert investigations.

With reference to Test 3, conducted for a non-SSD, platter-based drive, the prior art TD1 system imaged the drive in 77 minutes 48 seconds at a rate of 4.113 GB/min and required 40 minutes for removal and replacement of the drive from the target computer. The present invention imaged the drive in 58 minutes 31 seconds at a rate of 5.469 GB/min without the need to remove the drive from the target computer.

Test 3 also shows that the addition of an additional PCIe Express Card increases the USB 3.0 capability and increases the speed of imaging and so the efficiency of data extraction from the target device.

In conclusion, the imaging system and method of the present invention have been shown to offer a significantly higher speed of imaging so that a significantly reduced imaging time is required.

APPENDIX 2

To optimise imaging of the target digital memory, testing of transfer speed for varying read buffer size and write buffer size was carried out on a typical mid-range system. The system comprised an 8 GB memory, a Western Digital "Green" 5400 RPM disc and four USB 2.0 ports. Each test was carried out on the same machine with only the buffer size varied between tests. The results of this testing are summarised in [Table 3].

TABLE 3

| | Write size: | | | | | | | | | | |
|---|---|---|---|---|---|---|---|---|---|---|---|
| Read size: | 0.031 | 0.06 | 0.125 | 0.25 | 1 | 1.5 | 2 | 3 | 4 | 8 | 32 |
| 0.031 | | | 10.98 | 14.33 | 75.89 | 17.52 | 16.06 | | 16.48 | | 23.87 |
| 0.125 | 51.4 | 51.5 | | | 73.69 | | | 19.08 | | 20.75 | |
| 1 | 76.14 | | 77.2 | 75.42 | 28 | | | | 21.27 | | |
| 2 | | 76.87 | 79.22 | 78.62 | 77.13 | 77.69 | 26.94 | 25.55 | | | 19.6 |
| 3 | | | 77.93 | 77.53 | | | 77.78 | 27.13 | | | |
| 4 | 76.2 | | | | 78.15 | | 77.4 | 76.33 | 29 | | |
| 6 | | | | | | 77.89 | 77.99 | 78.2 | 77.47 | | |
| 8 | 77.18 | | 76.4 | 76.1 | 78.5 | | 77.93 | 75.92 | 77.9 | 27.1 | 26.1 |
| 10 | | | | | | | 77.8 | | | | |
| 12 | | 78.22 | | | | | 79.16 | 78.32 | | | |
| 16 | 75.79 | 80.63 | 80.14 | 79.22 | 76.27 | 77.21 | 79.3 | 78.82 | 77.81 | 76.24 | 32.29 |

Comments on Test Results

From this testing it was concluded that provided the read buffer size is a multiple of the write buffer size then the transfer speed is satisfactory.

The invention claimed is:

1. A digital memory imaging system for imaging the digital memory of a target computer comprising:
    a plurality of removable data storage devices each connectable to the target computer; and
    a software subsystem adapted to imaging the digital memory of the target computer; outputting the imaged digital memory as a series of data blocks to at least two of the removable data storage devices; and assigning each data block of imaged digital memory to the at least two of the removable data storage devices according to a queuing subsystem; and
    a display adapted to displaying an indicia of the removable data storage devices that are available for storing data blocks, displaying information about the status of imaging the digital memory into an image file, and displaying information when any one of the plurality of removable data storage devices is full, wherein the display is the display associated with the target computer;
    wherein each of the at least two of the removable data storage devices has a queue of data to be stored thereon that is constantly monitored by the software subsystem,
    wherein each data block of imaged digital memory is assigned based on one or both of the respective free memory available on each of the removable data storage devices and the respective speed of the removable data storage devices, and
    wherein the software leaves the target computer in a condition that is identical to its condition prior to imaging the digital memory.

2. A digital memory imaging system according to claim 1 wherein the plurality of removable data storage devices comprise any combination of a USB, an eSata external drive, an SD card, an SD micro card, an SSD drive, and a DVD drive.

3. A digital memory imaging system according to claim 1, the software subsystem further adapted to labelling each imaged data block with a header comprising any combination of a sequence number, a data block length, a source address, a compression value, a time stamp, and a unique identifier.

4. A digital memory imaging system according to claim 1, the software subsystem further adapted to detecting an interruption of the imaging of the digital memory and storing the imaged digital memory to the point of interruption.

5. A digital memory imaging method for imaging the digital memory of a target computer comprising the steps of:
    connecting a plurality of removable data storage devices to the target computer;
    executing software on one of the plurality of removable data storage devices for imaging the digital memory of the target computer;
    outputting the imaged digital memory as a series of data blocks to at least two of the removable data storage devices;

assigning each data block of imaged digital memory to the at least two of the removable data storage devices according to a queuing system, wherein each of the at least two of the removable data storage devices has a queue of data to be stored thereon that is constantly monitored, and wherein assigning each data block of imaged digital memory is based on one or both of the respective free memory available on each of the removable data storage devices and the respective speed of the removable data storage devices;

storing the assigned data blocks to the at least two of the plurality of removable data storage devices;

displaying progress information relating to the imaging step, wherein the display is the display associated with the target computer; and disconnecting the plurality of removable data storage devices from the target computer, wherein the target computer is left in a condition that is identical to its condition prior to imaging the digital memory.

6. A digital memory imaging method according to claim 5 further comprising the step of labelling each imaged data block with a header comprising any combination of a sequence number, a data block length, a source address, a compression value, a time stamp, and a unique identifier.

7. A digital memory imaging method according to claim 5 further comprising the steps of storing the imaged digital memory at a point of interruption.

8. A digital memory imaging system according to claim 1, wherein the digital memory of the target computer is one or more of a hard disc, a flash memory, and a random-access memory (RAM).

9. A digital memory imaging system according to claim 1, wherein the software subsystem is stored on one of the plurality of removable data storage devices when the plurality of removable data storage devices are connected to the target computer, and wherein the one of the plurality of removable data storage devices containing the software subsystem is excluded from the at least one or more removable data storage devices that are used for assigning the data blocks of imaged digital memory.

10. A digital memory imaging method according to claim 5, wherein the digital memory of the target computer is one or more of a hard disc, a flash memory, and a random-access memory (RAM).

11. A digital memory imaging method according to claim 5, wherein the plurality of connected removable data storage devices comprise any combination of a USB, an eSata external drive, an SD card, an SD micro card, an SSD drive, and a DVD drive.

12. A digital memory imaging method according to claim 5, further comprising the step of executing a software stored on one of the connected plurality of removable data storage devices for imaging the digital memory of the target computer.

13. A digital memory imaging method according to claim 12, wherein the step of assigning each data block of imaged digital memory excludes assigning any data block to the one of the connected plurality of removable data storage devices executing the software.

14. A digital memory imaging system for imaging the digital memory of a target computer comprising:
a plurality of removable data storage devices each connectable to the target computer;
a software subsystem stored on and adapted to executing locally from one of the removable data storage devices upon connection to the target computer, wherein the software subsystem is further adapted to imaging the digital memory of the target computer; outputting the imaged digital memory as a series of data blocks to at least two of the removable data storage devices; and assigning each data block of imaged digital memory to the at least two of the removable data storage devices according to a queuing subsystem; and
a display adapted to displaying an indicia of the removable data storage devices that are available for storing data blocks, displaying information about the status of imaging the digital memory into an image file, and displaying information when any one of the plurality of removable data storage devices is full,
wherein each of the at least two of the removable data storage devices has a queue of data to be stored thereon that is constantly monitored by the software subsystem,
wherein each data block of imaged digital memory is assigned based on one or both of the respective free memory available on each of the removable data storage devices and the respective speed of the removable data storage devices,
wherein the software leaves the target computer in a condition that is identical to its condition prior to imaging the digital memory.

15. A digital memory imaging system according to claim 14, wherein the plurality of removable data storage devices comprise any combination of a USB, an eSata external drive, an SD card, an SD micro card, an SSD drive, and a DVD drive.

16. A digital memory imaging system according to claim 14, the software subsystem further adapted to detecting an interruption of the imaging of the digital memory and storing the imaged digital memory to the point of interruption.

17. A digital memory imaging method for imaging the digital memory of a target computer comprising the steps of:
storing software on one of a plurality of removable data storage devices;
connecting the plurality of removable data storage devices to the target computer;
locally executing the software from the one of the plurality of removable data storage devices for imaging the digital memory of the target computer;
outputting the imaged digital memory as a series of data blocks to at least two of the removable data storage devices;
assigning each data block of imaged digital memory to the at least two of the removable data storage device according to a queuing system, wherein each of the at least two of the removable data storage device has a queue of data to be stored thereon that is constantly monitored, and wherein assigning each data block of imaged digital memory is based on one or both of the respective free memory available on each of the removable data storage devices and the respective speed of the removable data storage devices;
storing the assigned data blocks to the at least two of the plurality of removable data storage devices;
displaying progress information relating to the imaging step, wherein the display is the display associated with the target computer; and
disconnecting the plurality of removable data storage devices from the target computer,
wherein the target computer is left in a condition that is identical to its condition prior to imaging the digital memory.

18. A digital memory imaging method according to claim 17 further comprising the steps of storing the imaged digital memory at a point of interruption.

19. A digital memory imaging method according to claim 17, wherein the plurality of connected removable data storage devices comprise any combination of a USB, an eSata external drive, an SD card, an SD micro card, an SSD drive, and a DVD drive.

20. A digital memory imaging method according to claim 17, wherein the step of assigning each data block of imaged digital memory excludes assigning any data block to the one of the connected plurality of removable data storage devices executing the software.

* * * * *